United States Patent

[11] 3,581,476

| [72] | Inventor | Richard D. Rivers |
| | | Louisville, Ky. |
| [21] | Appl. No. | 758,743 |
| [22] | Filed | Sept. 10, 1968 |
| [45] | Patented | June 1, 1971 |
| [73] | Assignee | American Air Filter Company, Inc. |
| | | Louisville, Ky. |

[54] FLUID-TREATING CARTRIDGE CONSTRUCTION
5 Claims, 5 Drawing Figs.

| [52] | U.S. Cl. | 55/387, 55/491, 55/492 |
| [51] | Int. Cl. | B01d 53/04 |
| [50] | Field of Search | 55/316, 318, 387, 491, 492 |

[56] References Cited
UNITED STATES PATENTS

| 1,395,833 | 11/1921 | Kling et al. | 55/491X |
| 2,080,578 | 5/1937 | Ray | 55/387X |
| 3,271,932 | 9/1966 | Newell | 55/491X |
| 3,411,273 | 11/1968 | Duncan et al. | 55/387 |

Primary Examiner—John Adee
Attorney—Ralph B. Brick

ABSTRACT: A disposable cartridge having chamber means to be filled with selected fluid-treating material and fluid flow conduit means to direct a fluid stream through the fluid-treating material for removal of impurities or undesirable substances carried by the fluid. The cartridge includes a frame member adapted to receive perforate plate members in spaced relation to form alternate fluid flow chambers and chambers to hold the selected fluid-treating material.

PATENTED JUN 1 1971

INVENTOR.
RICHARD D. RIVERS

BY *Edward M. Stenterman*

ATTORNEY

INVENTOR.
RICHARD D. RIVERS

BY Edward M. Steutermann

ATTORNEY

FLUID-TREATING CARTRIDGE CONSTRUCTION

BACKGROUND OF THE INVENTION

In various applications an undesirable impurity is removed from a fluid, for example a gas stream, by passing the stream through a fluid-treating material, for example a porous bed of adsorbing media. In many such applications, the adsorbed impurity is subsequently removed from the adsorbent by regeneration so the adsorbent can be reused, and in some cases the impurity is then subsequently recovered.

Various apparatus has been provided to satisfy the requirements of such applications, and most equipment has been of heavy rigid construction because it is designed to withstand successive cycles of use and renewal or regeneration of the fluid-treating material. Consequently, such apparatus has been expensive.

In most applications where an adsorbent is used as the treating material and is regenerated, the adsorbent eventually becomes inactive or disintegrates after successive cycles of use and regeneration so means must be provided to periodically replace the charge of adsorbent contained in the cartridge. Therefore, in most previous apparatus the cartridges are generally releasably retained in a cooperative frame assembly and expensive lock arrangements have been provided to open the cartridge for removal of the adsorbent.

Since such adsorber cartridges are provided to separate impurities from a fluid it is necessary that all of the fluid pass through the cartridge and previous arrangements have included complex seal assemblies to prevent undesirable fluid leakage around the cartridge.

SUMMARY OF THE INVENTION

The present invention recognizes that in various applications, for example in the treatment of an effluent fluid stream from nuclear energy installations, a fluid-treating material, for example an adsorbent material contained in a cartridge is provided to receive the stream of effluent material under emergency circumstances and therefore must be capable of adsorbing impurities carried by such effluent while withstanding unusual operating characteristics, for example extremely high pressure, temperature or fluid flow rate. It is further recognized that in such applications the adsorbent material and the containers are contaminated by certain materials carried by the fluid so the entire assembly is discarded after only a single use and therefore is desirable to provide an inexpensive cartridge which is sturdy enough to withstand highly adverse operating conditions which might be encountered.

It is further recognized that the present invention provides a disposable adsorbent holding cartridge assembly and retaining frame arrangement which is essentially self-sealing to eliminate complex seal arrangements and is straightforward to fabricate. Furthermore, it has been recognized that the present invention provides a filter cartridge which can be made of lightweight metal or other material to decrease the materials cost yet the cartridge is extremely sturdy and advantageously provides cooperative fluid flow channels to maximize fluid flow rate through the cartridge while minimizing the pressure drop experienced by the fluid.

Various other features of the present invention will become obvious to those skilled in the art upon reading the disclosure set forth hereinafter.

More particularly, the present invention provides a fluid-treating cartridge comprising: a generally U-shaped frame member having an open end; at least two first perforate plates to be received by such frame member and held in mutually-spaced relation within the frame to form gas flow chamber means therebetween where the chamber communicates with the open end of the frame member; at least one spacer bar extending between the first perforated plate means through the chamber to support the first perforated plates at points intermediate the frame means; and second perforated plate means to be received by the frame means and disposed in spaced relation from the first perforate plate means to define adsorbent receiving chamber means between the first and second perforate plate means and the frame means; means to connect the spacer bar means to the second perforate plate means to provide selected spacing between the first and second perforate plate means; cover plate means to be fixed to the frame means around the open end thereof and having aperture means communicating with the gas flow chamber; and, fluid-treating material contained in the chambers defined between the first perforate plate means and the second perforate plate means.

It is to be understood that the example of one arrangement in accordance with the present invention given hereinafter is not by way of limitation and that various changes and modifications can be made in the example without departing from the scope or spirit of the present invention as defined in the claims hereinafter presented.

Referring now to the Figures which show an example of one apparatus in accordance with the present invention:

Figure 2:
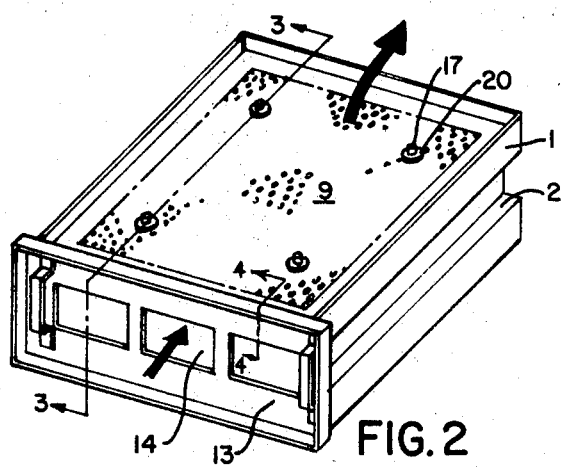
FIG. 2 is a view of the assembled cartridge of FIG. 1.
Figure 1:
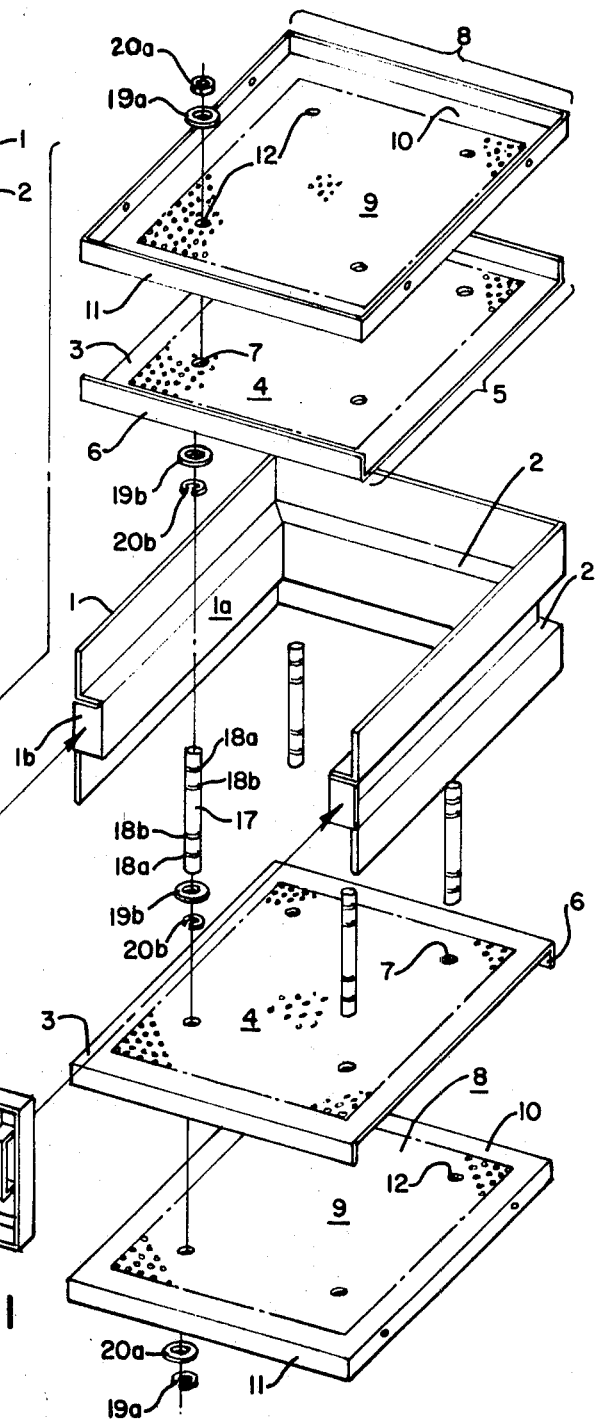
FIG. 1 is an exploded view of an example of an adsorbent-holding cartridge in accordance with the present invention.

The cartridge shown in FIG. 1 provides spaced chambers to hold a fluid-treating material which can be formed adjacent opposite edges of a generally U-shaped channel 1 where a gas flow chamber is formed intermediate the fluid treating chambers.

Channel 1, as shown in FIG. 1, has an internal recess 1a to provide spaced ledges 2 adapted to receive trays 5 which are retained in spaced relation within frame 1 as hereinafter described. Tabs 1b can be formed adjacent the open end of frame 1, as shown, to provide means for attaching a cover plate 13 to partially cover the open ends of channel 1, as hereinafter described.

Each tray 5 includes a perforated, gas-permeable plate 4 surrounded by a peripheral flange 3 with an upstanding spacer edge 6 provided adjacent selected edges of the flange. Cooperative selectively spaced apertures 7 are provided in perforated plates 4 of trays 5 to receive a spacer bar 17, hereinafter described.

Cover trays 8 are received by frame 1 and retained in spaced relation from each tray 5, as shown, to form an adsorbent receiving chamber 25 (FIG. 3) between trays 5 and 8. Each tray 8 includes a peripheral flange 10 surrounding a fluid permeable plate 9, for example of perforated metal, with an upstanding flange 11 adjacent the edges to attach tray 8 to channel 1 as hereinafter described. Perforated plates 9 can have apertures 12 in aligned relation with the apertures 7 of tray 5 to receive the ends of spacer bar 17 as hereinafter described.

In accordance with one feature of the present invention, spacer bars 17, hereinbefore referred to, are provided to support trays 5 and 8 in selected, separated relation within frame 10. Selectively spaced pairs of grooves 18a, 18b are cut into each spacer bar 17 adjacent each end of the spacer bar and it will be noted that the spacing between each of the grooves 18a, 18b can advantageously approximate the desired spacing between trays 5 and 8 on each side of frame 1 while the spacing between innermost grooves 18b is, advantageously, approximately equal to the spacing between trays 5.

Snap rings 20a, 20b can be provided to be received by grooves 18a, 18b and support washers 19a, 19b can be provided to be slipped over bars 17 to rest against snap rings 20a, 20b to hold the trays in spaced relation within frame 1 as hereinafter described.

A cover plate 13 having apertures 14 is provided, as shown, to be fastened to the open end of frame 1 to provide fluid flow communication with chamber 15 defined between trays 5 when the fluid-treating cartridge is assembled.

To assemble the apparatus shown in FIG. 1, one of the trays 5 is fastened to one ledge 2 of frame 1, for example by spot welding. Sealing means (not shown) can be provided between ledge 2 and peripheral frame 3 of tray 5, if desired, to prevent fluid leakage around tray 5. Snap rings 20b are then inserted into grooves 18b of spacer bars 17 and washers 19b are slipped over the ends of the spacer bars and moved to a position abutting the snap rings. The assembled spacer bars 17 carrying washers 19b are then inserted through apertures 7 so washers 19b are positioned against tray 5 which has been fastened to frame 1. The opposite tray 5 then is located in frame 1 in a similar position so the peripheral flange 3 of that tray rests on ledge 2 with the opposite ends of spacer bars 17 extending through cooperative apertures 7 so washers 19b at the other end of the spacer bar abut perforated plate 4 of the tray. The second tray 5 is then fastened to the other ledge 2 of frame 1, for example by spot welding, and as hereinbefore described, seal means (not shown) can be provided between flange 3 and ledge 2.

Cover plate 13 is fastened to the assembly, for example by spot welding to tabs 1b of frame 1 and upstanding edge 6 of each tray 5. It will be noted that plate 13 is disposed so apertures 14 communicate with gas flow chamber 15 defined between plate 5.

It will be noted that at this point the cartridge is assembled except for loading with adsorbent and fastening cover plate 8 to trays 5 and the partially assembled cartridge can be stored to be later filled with adsorbent before use.

When the cartridge is to be prepared for use trays 5 are filled, one at a time, with selected fluid-treating material, for example an adsorbent to remove a certain type of impurity from the fluid stream to be passed through the cartridge and a cover 8 is placed over each adsorbent-filled tray 5 with spacer bars 17 extending through cooperative apertures 12 in perforate plate 9 of trays 8.

Tray 5 can be filled to overflowing with adsorbent so tray 8 rests on the adsorbent, as shown in the example of the FIGURES, or the depth of adsorbent can be equal to or less than the depth of tray 8 so flange 10 rests on the upstanding edge 6 of each tray 5. It will be noted that in the example of the FIGURES, tray 8 is placed in frame 1 so upstanding peripheral flanges 11 abut face plate 13 and sides of frame 1 in position to be joined to the face plate and sides of the frame.

As each tray 8 is positioned in frame 1 washers 19a are placed over the end of each spacer 17 to rest on perforated plate 9, and snap rings 20 are clipped into grooves 18a provided at the end of spacer bars 17 to retain each tray 8 against the adsorbent and to limit the range of displacement of perforated plate 9. Spacer bars 17, washers 19a, 19b and rings 20a, 20b, can be selectively arranged to provide a selected compressive force on perforated plates 9, to further prevent displacement of the arrangement.

Figure 4:
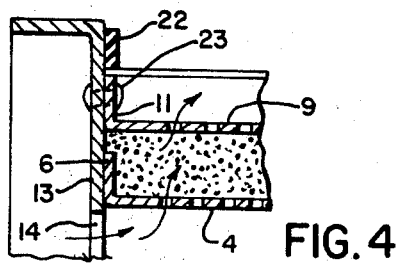
FIG. 4 is a magnified view taken along a plane passing though line 4—4 of FIG. 3 and, FIG. 5 is an elevation view, partly in section, of an example of a mounting arrangement for adsorber cartridges in accordance with the present invention.

As shown in FIG. 4, upstanding edges 11 of trays 8 can be fastened to face plate 13 and frame 1, for example by means of rivets 23. It will be noted in FIG. 4 that a sealing gasket 22 can be provided on the inside surface of cover plate 13 to prevent undesirable gas leakage around the edges of the plate.

Figure 5:
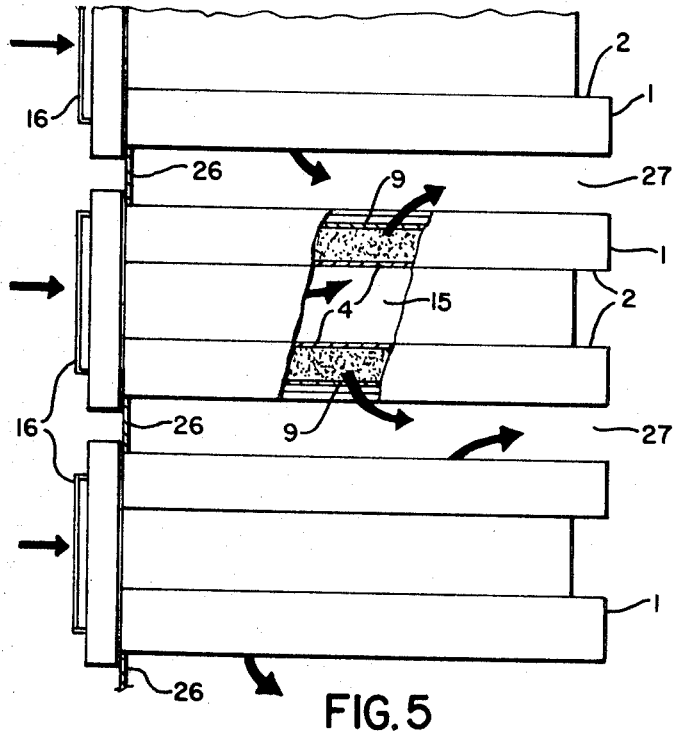

As shown in FIG. 5, the assembled filter cartridge can be inserted through apertures in a manifold arrangement 26. Clamp means (not shown) can be provided to retain the individual cartridges as shown.

Perforated plates 4 and 9 are supported to resist movement in response to sudden increases in gas flow or surges in pressure, by spacer bars 17 disposed intermediate the sides of frame 1 and cover 13. It is recognized that displacement of perforated plates 4 and 9 would be undesirable because it can lead to attrition of the fluid-treating material contained in chamber 25, separation of trays 5 from frame 1, and could also result in rearrangement of the particles of fluid-treating material within the chamber which would undesirably open channels through the adsorbent bed.

Figure 3:
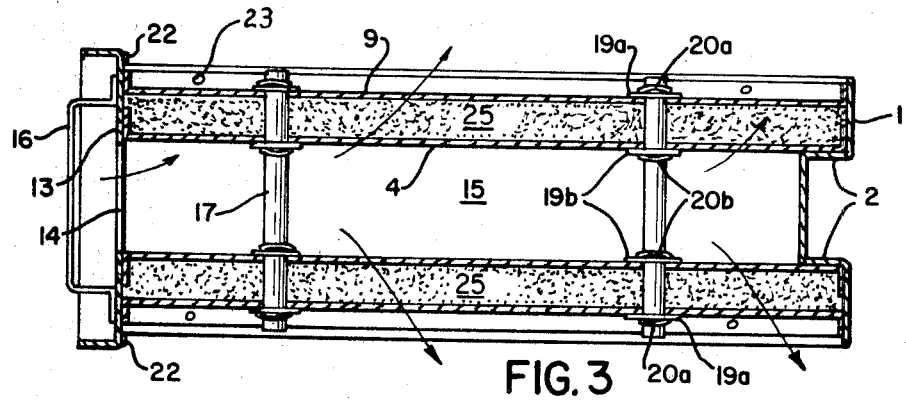
FIG. 3 is a view taken along a plane passing through line 3—3 of FIG. 2 and also indicates one example of a gas flow path through the cartridge.

Gas flow through the cartridges can be in either direction and, for example referring to FIG. 3, the gas stream can enter chamber 15 through apertures 14 of face plate 13 to be divided to flow through the adsorbent contained in chambers 25 on opposite sides of gas flow chamber 15.

As shown in FIG. 5, air emitted from the adsorbent beds flows through channels 27 defined between adjacent separated filter cartridges.

It is to be understood that the cartridges can also be disposed to receive air flow in a reverse direction where the gas flows through channels 27 defined between adjacent cartridges, enters the cartridges through the perforated plates 9, and flows into chamber 15 and out apertures 14 in face plate 13.

I claim:

1. A fluid-treating cartridge comprising a generally U-shaped member having an open end; at least two first perforate plate means to be received by such frame member and retained in mutually spaced relation within said frame member to form a gas flow chamber therebetween, which chamber communicates with said open end of said frame member; at least one spacer bar extending between said two first perforate plate means through said chamber to support said two first perforate plate means at points intermediate said frame member; at least two second perforate plate means to be received by said frame member and disposed in spaced relation from said first two perforate plate means sandwiched therebetween to define adsorbent receiving chambers between said first perforate plate means and said second perforate plate means; spacer means to connect said first plate means to said second plate means to retain selected spacing between said first and second plate means, cover plate means to be fixed adjacent the open end of said frame member, said cover plate means having aperture means communicating with said gas flow chamber defined by said frame member and said first perforate plate means; and, adsorbent material contained in said chambers defined between said first and second perforate plate means.

2. The fluid treating cartridge of claim 1 wherein said spacer bars extend through said first and second perforate plates means and through said gas flow chamber wherein ring means are selectively disposed on said spacer bar means to provide support for said first and second perforate plate means.

3. The fluid treating cartridge of claim 1 wherein said frame member includes inset surfaces extending around said frame member inset from the edges of said frame member wherein said first plate means are received by said inset surfaces and are fastened to said inset surfaces.

4. The apparatus of claim 1 wherein said adsorbent receiving chamber is defined by said frame member and said first and second perforate plate means are filled with adsorbent and said second perforate plate means is received by the surface of said adsorbent.

5. The apparatus of claim 3 wherein said first perforate plate means includes peripheral upstanding flange means directed toward said second perforate plate means and said second perforate plate means are received by the upstanding peripheral flange means.